United States Patent [19]
Hirabayashi et al.

[11] Patent Number: 5,680,225
[45] Date of Patent: Oct. 21, 1997

[54] IMAGE REDUCTION WITH FINE-LINE PROTECTION

[75] Inventors: Yasuji Hirabayashi, Kawasaki; Tadashi Yoshida, Ichikawa; Hidefumi Osawa, Kawaguchi, all of Japan

[73] Assignee: Canon Kabushiki Kaisha, Tokyo, Japan

[21] Appl. No.: 833,911

[22] Filed: Feb. 11, 1992

[30] Foreign Application Priority Data

Feb. 14, 1991 [JP] Japan .................................. 3-020663
Feb. 14, 1991 [JP] Japan .................................. 3-020664

[51] Int. Cl.$^6$ ............................................. H04N 1/393
[52] U.S. Cl. ................ 358/451; 382/258; 382/298
[58] Field of Search ............................ 358/451, 452, 358/453, 447, 448; 382/47, 256–259, 298–299; 355/55, 243; 399/196; H04N 1/393

[56] References Cited

U.S. PATENT DOCUMENTS

| | | | |
|---|---|---|---|
| 4,290,084 | 9/1981 | Minshull et al. | 358/260 |
| 4,503,469 | 5/1985 | Kato | 358/451 |
| 4,682,243 | 7/1987 | Hatayama | 358/451 |
| 4,930,021 | 5/1990 | Okada | 358/451 |
| 5,083,216 | 1/1992 | Abuyama | 358/451 |
| 5,159,468 | 10/1992 | Yoshida et al. | 358/451 |
| 5,270,836 | 12/1993 | Kang | 358/448 |
| 5,301,248 | 4/1994 | Takanori et al. | 382/256 |
| 5,335,295 | 8/1994 | Ferracini et al. | 358/451 |

FOREIGN PATENT DOCUMENTS 334677  2/1991  Japan .

Primary Examiner—Kim Vu
Attorney, Agent, or Firm—Fitzpatrick, Cella, Harper & Scinto

[57] ABSTRACT

A binary image reducing method is so adapted that image reduction in which the occurrence of discontinuous lines is eliminated, is made possible even when there is a change in the reduction magnification of an image containing many lines of one-pixel width and characters or the like composed of line elements having a width of one to several pixels, such as an image created by a computer. First, an original image is subjected to enlargement processing by a micro-enlarging circuit, whereby the image is enlarged by 2×p (where, and the reduction ratio is p). Thereafter, ½ reduction processing, of the type which preserves fine lines, is executed by a ½ reducing circuit. As a result, it is possible to achieve a change in reduction at any desired magnification of ½–1 as well as preservation of fine lines in the reduced image obtained. In another embodiment, an original image is subjected to enlargement processing by a micro-enlarging circuit, after which reduction processing, of a type which preserves fine lines, is executed by a repetitive reducing circuit in response to a command from a decision unit. As a result, it is possible to achieve a change in reduction at any desired magnification of 0–1 as well as preservation of fine lines in the reduced image obtained.

38 Claims, 10 Drawing Sheets

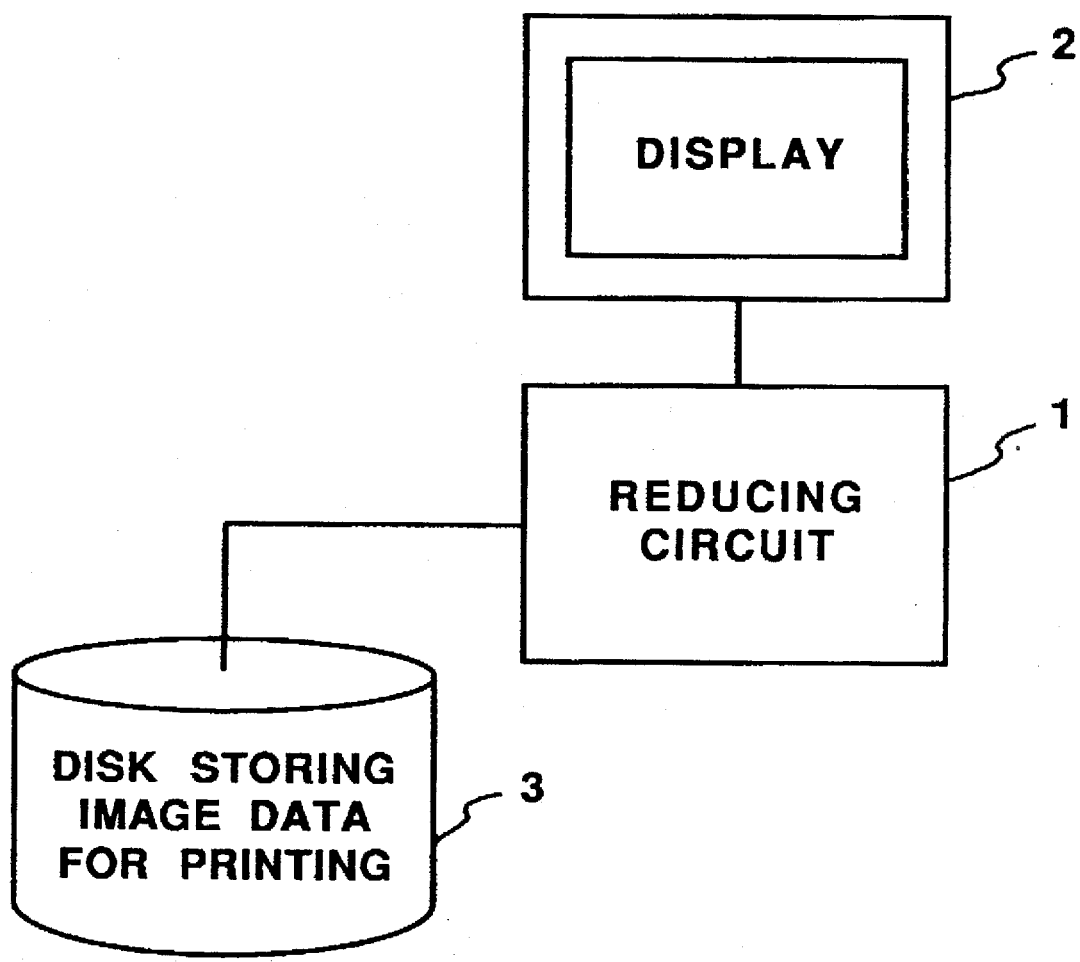
F I G. 8

IMAGE REDUCTION WITH FINE-LINE PROTECTION

BACKGROUND OF THE INVENTION

1. Field of the Invention

This invention relates to a method of reducing an image expressed by data for every pixel.

2. Description of the Related Art

Conventionally, a change in the magnification of image reduction almost always is performed merely by thinning out pixels by sub-sampling. Reduction using the so-called projection method also is employed.

In recent years, CAD word processors have appeared which deal with a change in the magnification of reduction applied to a computer-generated image produced by such an apparatus. A characterizing feature of these images is that they contain many lines which are one pixel in width and characters, etc., composed of line elements having a width of one to several pixels.

In accordance with this method, a fairly large number of portions are lost when the conventionally used technique such as sub-sampling or the projection method is applied to an image containing many lines which are one pixel in width and characters, etc., composed of line elements having a width of one to several pixels.

Another problem is that continuous curves such as the contour lines of objects become discontinuous lines as a result of the reducing operation.

For example, in case of image reduction for making a line density conversion of 400 dpi→300 dpi, the conventional conversion is performed by thinning out one pixel per four pixels in the main scanning direction and one line per four lines in the subordinate scanning direction.

More specifically, with respect to an original image shown in FIG. 9A, one pixel is thinned out per four pixels in the main scanning direction and one line is thinned out per four lines in the subordinate scanning direction, as illustrated in FIG. 9B. The result is a reduced image shown in FIG. 9C, in which it is seen that a significant part of the fine lines in the image is lost owing to simple thinning.

This tendency to lose data appears even when there is a very small reduction in magnification (slightly less than a magnification of unity) and becomes more pronounced as the ratio of reduction is increased. At a reduction of 1/n (n≧2), a major part of the fine lines in the image is lost. When the projection method is employed, this tendency becomes even more conspicuous.

For example, in case of image reduction for making a line density conversion of 400 dpi→150 dpi, the conventional conversion is performed by thinning out five pixels per eight pixels in the main scanning direction and five lines per eight lines in the subordinate scanning direction.

Specifically, with respect to an original image shown in FIG. 10A, five pixels are thinned out per eight pixels in the main scanning direction and five lines are thinned out per eight lines in the subordinate scanning direction, as illustrated in FIG. 10B. The result is a reduced image shown in FIG. 10C, in which it is seen that a significant part of the fine lines in the image is lost owing to simple thinning.

SUMMARY OF THE INVENTION

An object of the present invention is to provide a image reducing method whereby image reduction in which the occurrence of discontinuous lines is eliminated is made possible even when there is a change in the reduction magnification of an image containing many lines of one-pixel width and characters or the like composed of line elements having a width of one to several pixels, such as an image created by a computer.

According to the present invention, the foregoing object is attained by providing magnification varying means for micro-enlarging an image, and reducing means of a type which preserves fine lines.

By way of example, the magnification varying means has an enlargement ratio of 2 or less, and the reducing means has a reduction ratio of ½.

By thus combining, into a single process, a magnification varying operation for slight enlargement and a reducing operation which completely preserves the structure of fine lines, it is possible to achieve reduction at any desired magnification as well as the preservation of fine lines in an image whose reduction magnification is changed, the latter of which is difficult to achieve in the related art.

Alternatively, by first applying enlargement processing by the magnification varying means to an inputted image and then applying reduction processing a plurality of times by the reducing means, it is possible to achieve a change in reduction at any desired magnification as well as the preservation of fine lines in the reduced image obtained. By thus combining, into a single process, a magnification varying operation for slight enlargement and a reducing operation which completely preserves the structure of fine lines, it is possible to achieve reduction at any desired magnification as well as the preservation of fine lines in an image whose reduction magnification is changed, the latter of which is difficult to achieve in the related art.

Further objects, features and advantages of the present invention will become apparent from the following detailed description of embodiments of the present invention taken with reference to the accompanying drawings.

BRIEF DESCRIPTION OF THE DRAWINGS

FIG. 8 is a conceptual view showing an image reducing apparatus according to a fourth embodiment of the invention.

DESCRIPTION OF THE PREFERRED EMBODIMENTS

Embodiments of the present invention will now be described with reference to the accompanying drawings.

<First Embodiment>

Figure 1:
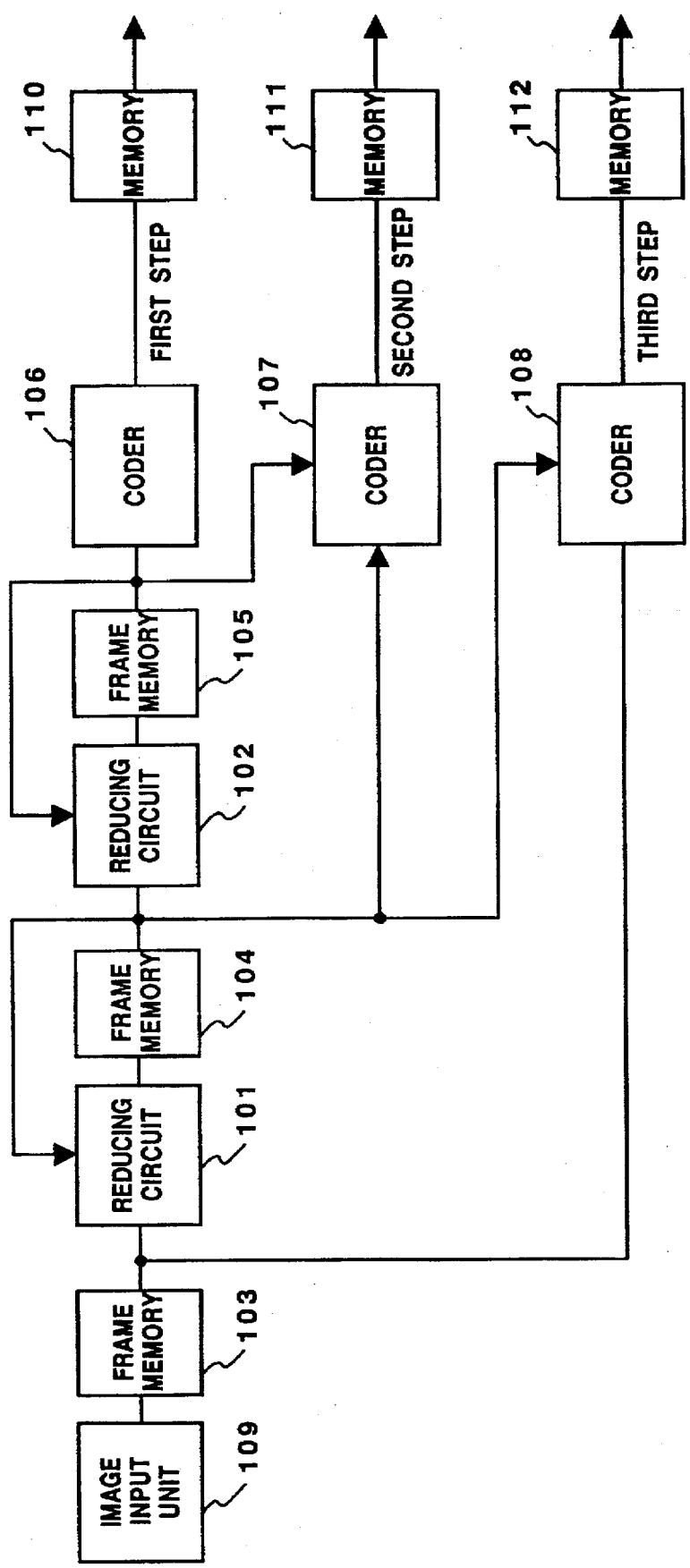
FIG. 1 is a block diagram illustrating hierarchical coders according to an embodiment of the present invention.

FIG. 1 is a block diagram for a case where a reducing circuit according to a first embodiment of the invention is applied to hierarchical coding. Shown in FIG. 1 are frame memories 103, 104, 105, reducing circuits 101, 102, and coders 106, 107, 108.

First, data indicative of an original image inputted from an image input unit 109 such as an image reader, which comprises a CCD, or a computer is stored in the frame memory 103. Next, reduction processing is executed by the reducing circuit 101 and the reduced data is stored in a frame memory 104. The signal stored at this time is one obtained by reducing the original image to 1/p. Similarly, the signal read out of the frame memory 104 is reduced by the reducing circuit 102 to an image which is $1/p^2$ of the original image, and this reduced image is stored in the frame memory 105.

The coder 106 uses a technique such as arithmetic coding to code the signal that has been stored in the frame memory 105, and outputs the coded signal as a signal of a first stage (or first step). Similarly, the coders 107, 108 code the signals that have been stored in the respective frame memories 104, 105 while referring to the data stored in respective frame memories 103, 104, and output signals of second and third stages, respectively. The signals of the first through third stages or steps are stored in respective memories 110 through 112.

By thus coding and transmitting the image data from the first through third stages in order from image data having the lowest resolution, the overall appearance of the image is rapidly identified and, if data is unnecessary, it is possible to halt subsequent transmission. This makes it possible to provide a more efficient image communication service.

Though coding through only three stages has been described, it goes without saying that this can readily be expanded to any number of stages.

Figure 2:
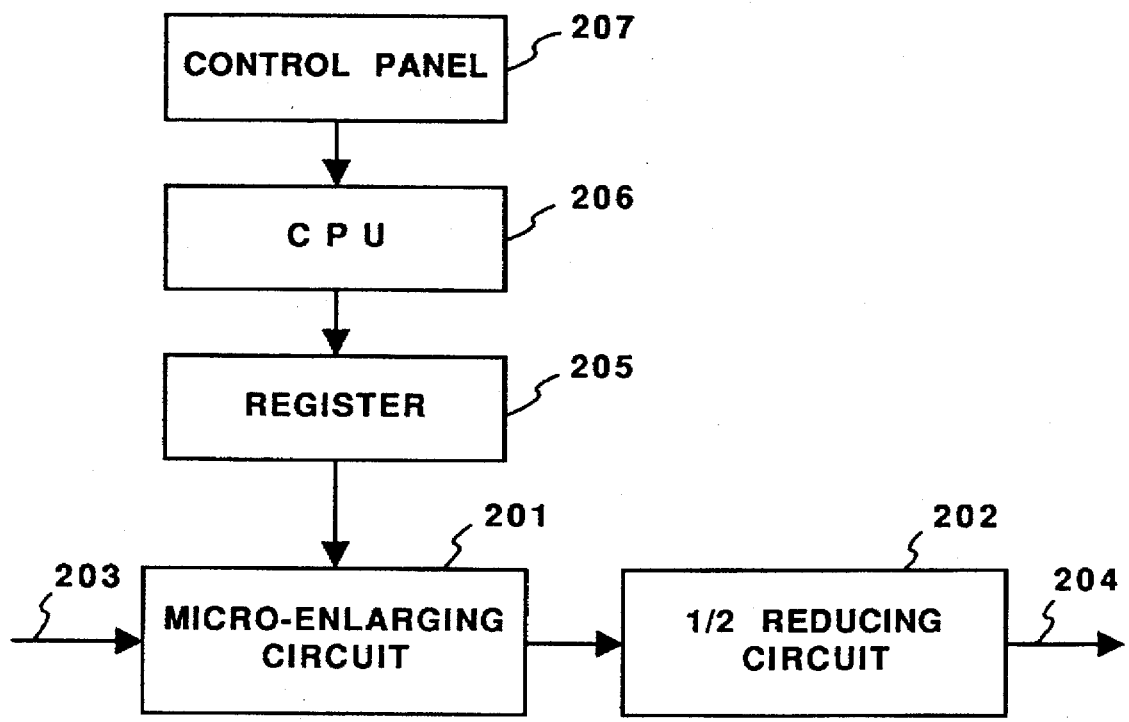
FIG. 2 is a detailed block diagram of the reducing circuit shown in FIG. 1.

FIG. 2 is a detailed block diagram of the reducing circuits 101, 102 shown in FIG. 1. Depicted in FIG. 2 are a micro-enlarging circuit 201, a ½ reducing circuit 202, an input line 203 for original-image data, and an output line 204 for a reduced image. Numeral 205 denotes a register for setting an image reduction ratio, which is designated by the operator at a control panel 207, via a CPU 206.

In a case where the reduction ratio inputted from the register 205 is p ($0.5 \leq p \leq 1$), the circuitry of FIG. 2 performs an enlarging operation at an enlargement ratio of 2×p. Since the enlargement ratio is small, i.e., 1 ~2 times, a satisfactory picture quality is obtained at the simplest periodic pixel supplementation.

Figure 3:
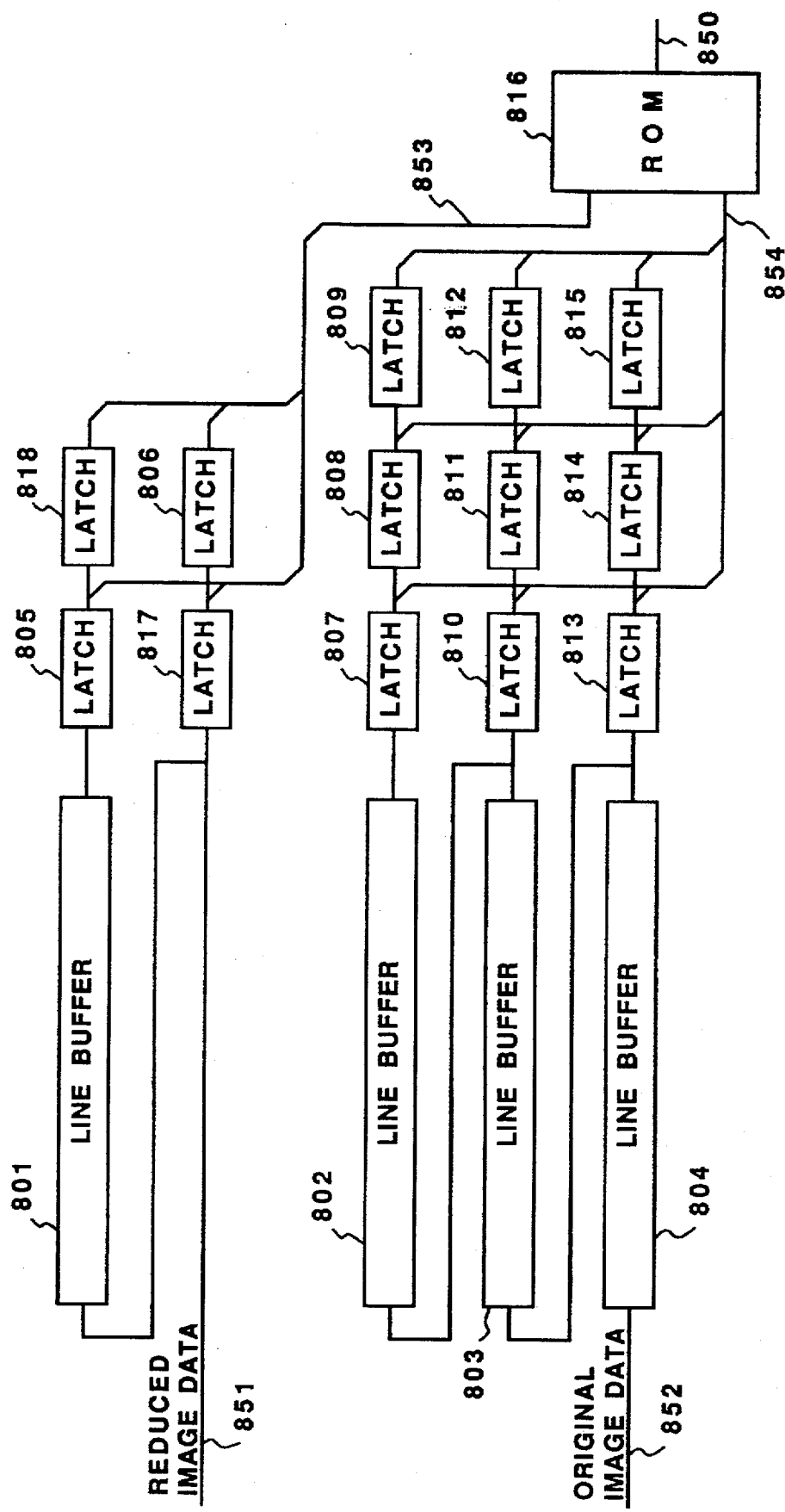
FIG. 3 is a detailed block diagram of the ½ reducing circuit shown in FIG. 2.

FIG. 3 is a detailed block diagram showing the ½ reducing circuit 202 of FIG. 2. Shown in FIG. 3 are line buffers 801–804, latches 805–815 and 817–818, a ROM 816, an input line 852 for original-image data inputted from the micro-enlarging circuit 201 of FIG. 2, and a data line 850 for outputting reduced pixel values on the output line 204 of FIG. 2.

Reduced image data inputted from a signal line 851 is such that, with respect to a pixel to be processed on a reduced image frame, reference can be made to already processed pixels, namely one pixel above this pixel, one pixel to the upper left and one pixel to the left, by means of the arrangement composed of the line buffer 801 and latches 805, 806, 817 and 818. Similarly, original-image data inputted from line 852 is such that reference can be made simultaneously to nine pixels peripheral to a pixel of interest by means of the same arrangement.

The referential data is inputted to the ROM 816 from signal lines 853, 854. The ROM 816 produces the optimum output with regard to an inputted 12-bit address. When 12 referential pixels are inputted, reduced pixel values are rapidly decided and outputted on line 850. The signal from line 850 enters line 851 as is.

Figure 4A:
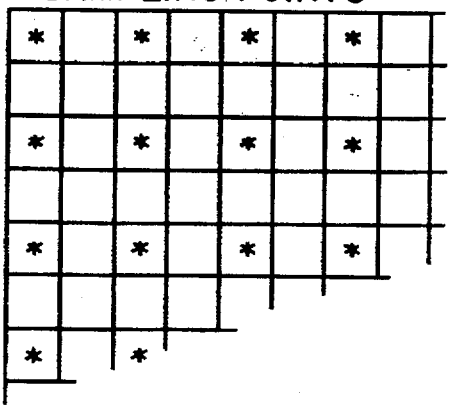
FIGS. 4A and 4B are diagrams for describing a sampling method and referential pixels at the time of reduction according to this embodiment.
Figure 4B:
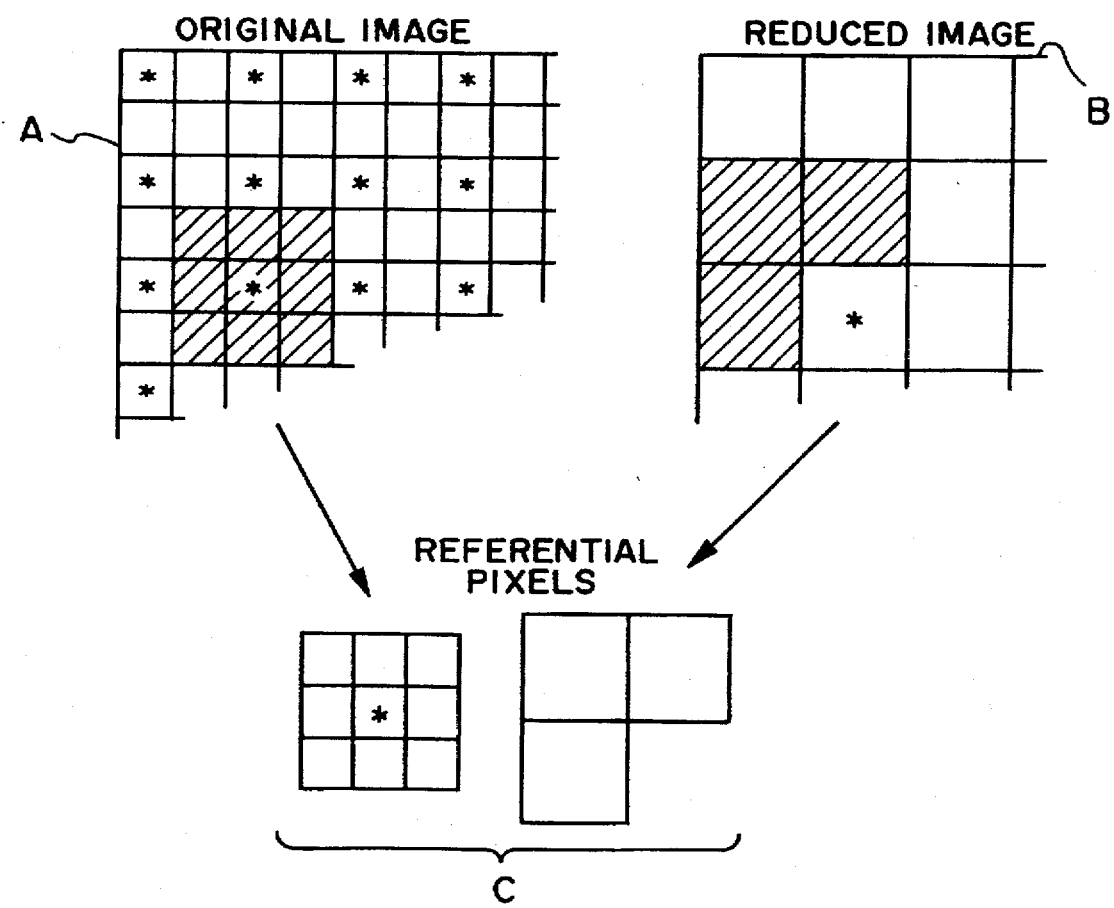

FIGS. 4A and 4B are diagrams for describing a sampling method and reference method performed by the ½ reducing circuit 202 of FIG. 2.

FIG. 4A illustrates sampling points, in which pixels indicated by the "*" marks are referred to from the latch 811 of FIG. 3. FIG. 4B-A illustrates referential pixels surrounding a sampling point in an original image frame, and FIG. 4B-B illustrates referential pixels in a reduced image frame at a position corresponding to sampling point.

When a white/black output is decided with regard to the 12 referential pixels, a reducing method of the type which preserves fine lines, as disclosed, for example, in the specification of U.S. patent application Ser. No. 07/501,846 filed on Mar. 30, 1990 now U.S. Pat. No. 5,159,468 (Japanese Patent Application Laid-Open No. 3-34677) of the present assignee, is used to obtain outputs corresponding to all states of the 12 input pixels, and the outputs written in the ROM 816 of FIG. 3 in advance. U.S. patent application Ser. No. 07/501,846 should be incorporated into this specification by reference.

In accordance with the first embodiment described above, an enlarging operation which involves simple processing and a fine-line preserving, variable-magnification ½ reducing operation are combined, thereby making it possible to perform a change in magnification at any reduction ratio of 1 to ½. In addition, the structure of fine lines in a reduced image can be preserved.

In accordance with the present invention, as described above, an enlarging operation which involves simple processing and a fine-line preserving, variable-magnification ½ reducing operation are combined, thereby making it possible to perform a change in magnification a reduction ratio of 1 to ½. In addition, the structure of fine lines in a reduced image can be preserved.

<Second Embodiment>

A second embodiment according to the invention will now be described with reference to FIGS. 5 and 6.

The general arrangement of the hierarchical coder in the second embodiment is similar to that of the hierarchical coder shown in FIG. 1, and only portions of the detailed construction of each circuit differ. Accordingly, a description of the general arrangement and operation of the overall hierarchical coder is omitted and the following discussion will deal mainly with the portions that are different from the first embodiment.

In the second embodiment, the reducing circuits 101, 102 differ from those of the first embodiment.

Figure 5:
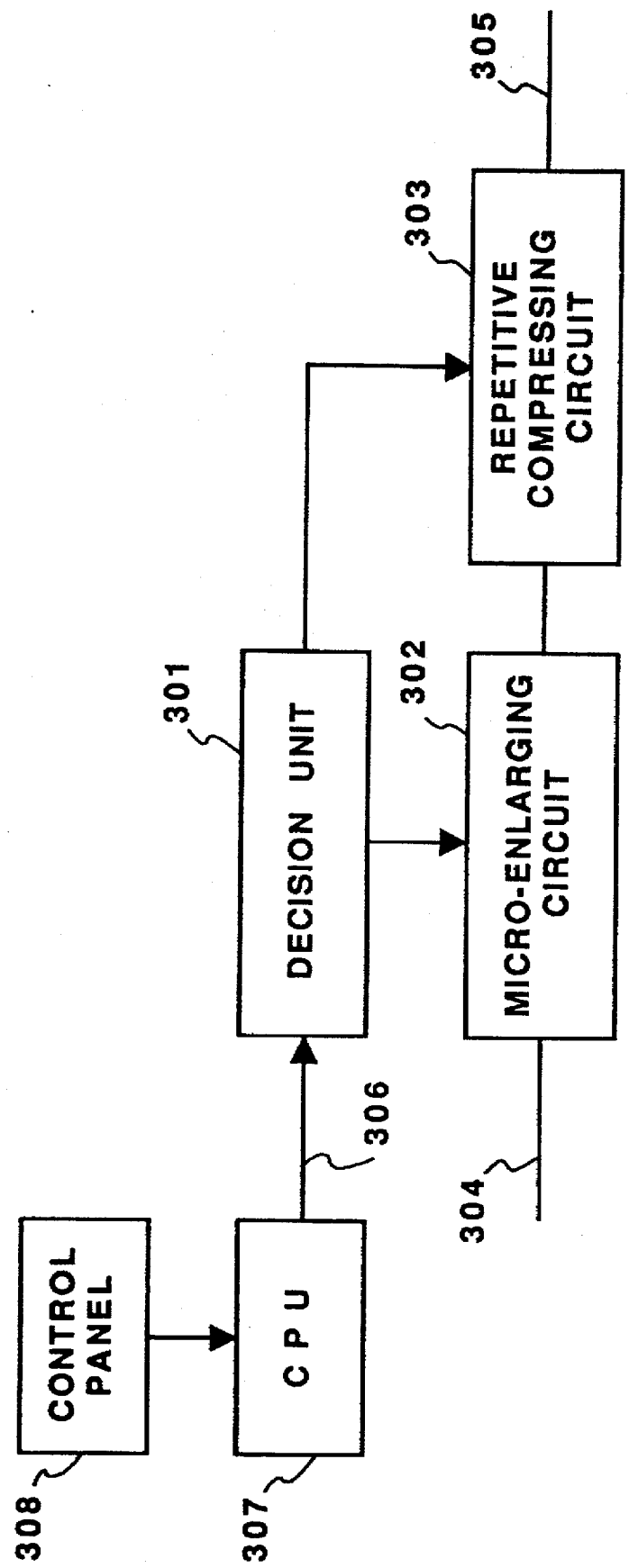
FIG. 5 is a detailed block diagram showing a reducing circuit in a hierarchical coder according to a second embodiment of the present invention.

FIG. 5 is a detailed block diagram of the reducing circuits 101, 102 according to the second embodiment. Shown in FIG. 5 are a micro-enlarging circuit 302, a repetitive reducing circuit 303, an input line 304 for original-image data, an output line 305 for reduced image data, an input line 306 for externally inputting the reduction ratio, and a decision unit 301 which, in accordance with the reducing ratio, decides parameter values applied to the micro-enlarging circuit 302 and repetitive reducing circuit 303.

The decision unit 301 calculates an enlargement ratio E and a number r of repetitions, in accordance with the equations given below, and sends the resulting data to the micro-enlarging circuit 302 and repetitive reducing circuit 303.

When the reduction magnification is p, for example, the following equations hold:

Number r of repetitions:=[−log2p](raising)

Enlargement ratio: $E=p*2^r$

Here r is an integer equal to or greater than 1, and E has a value of 1~2.

Since the enlargement ratio in the micro-enlarging circuit always is a value of 1~2, a satisfactory picture quality is obtained even when the enlarging operation is performed at the simplest periodic pixel supplementation.

Figure 6:
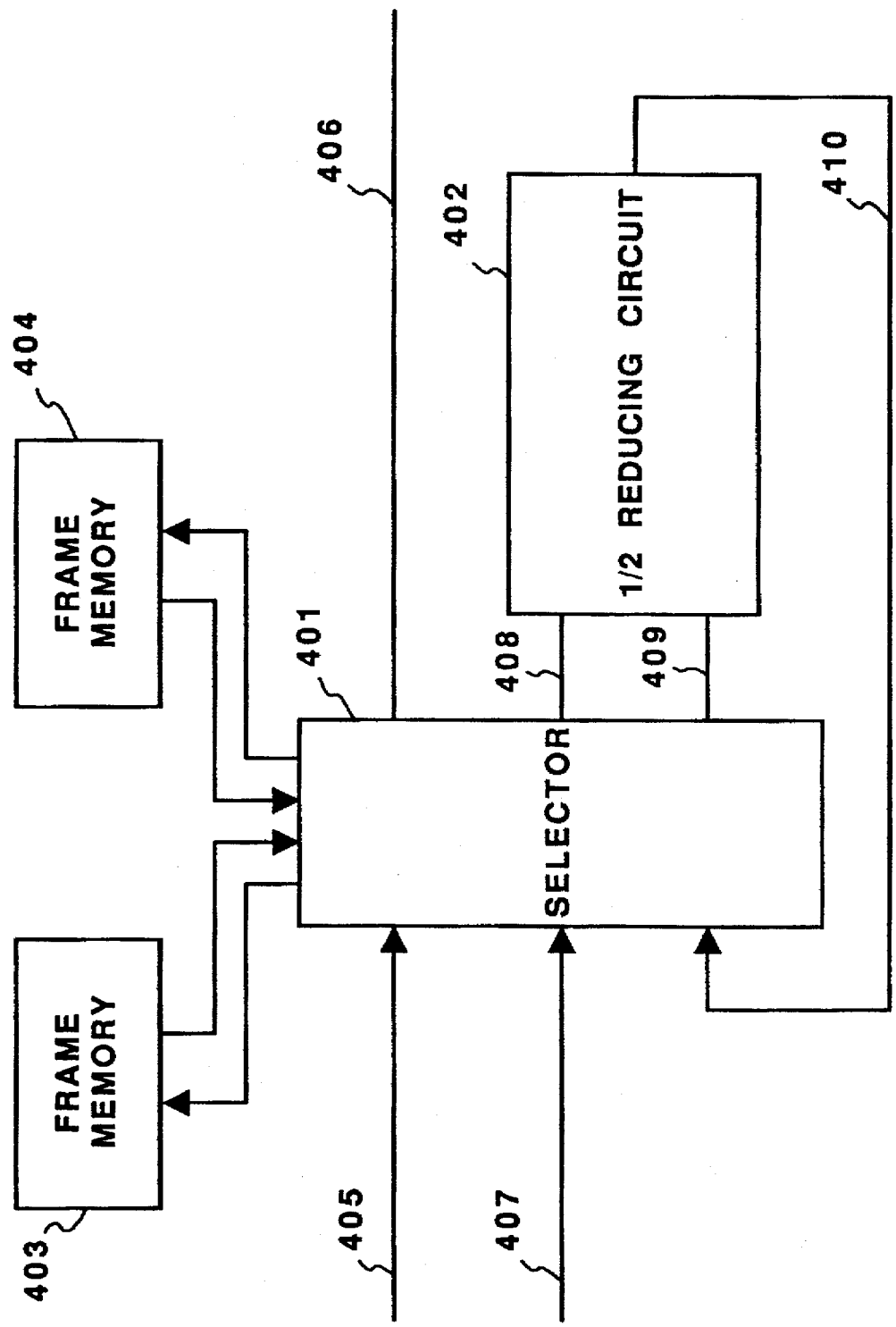
FIG. 6 is a detailed block diagram of a repetitive reducing circuit shown in FIG. 5.
Figure 7A:
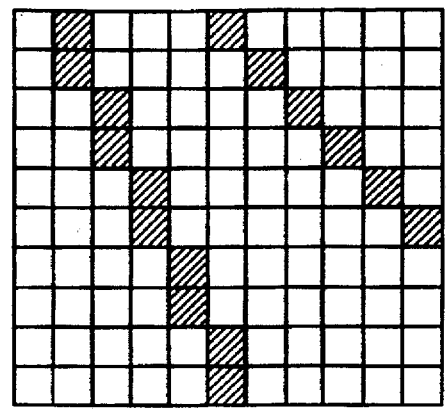
FIGS. 7A to 7D are diagrams for describing a specific example of image reduction according to a third embodiment.
Figure 7B:
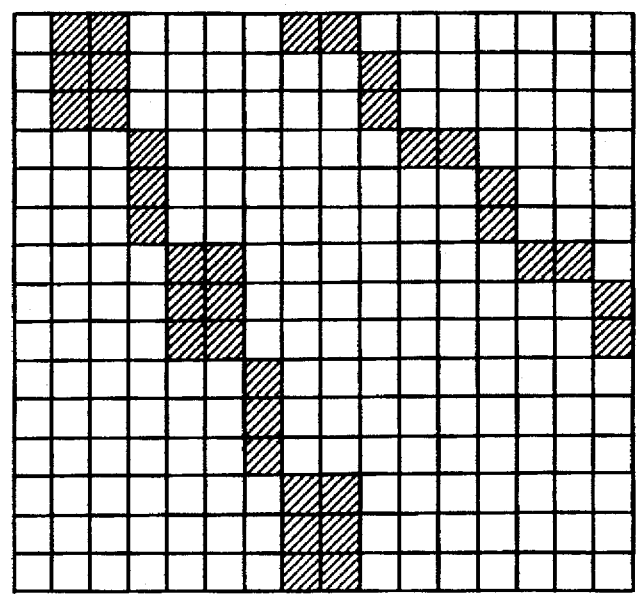
Figure 7C:
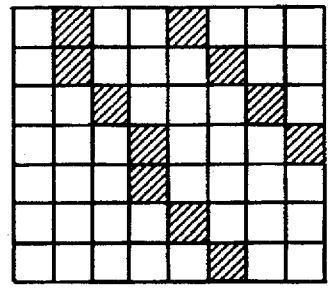
Figure 7D:
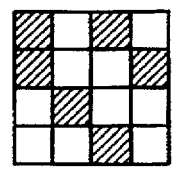

FIG. 6 is a block diagram showing the detailed construction of the repetitive reducing circuit 303 illustrated in FIG. 5.

Depicted in FIG. 6 are an input/output selector 401, a ½ reducing circuit 402, frame memories 303, 304, an input line 405 for image data inputted from the micro-enlarging circuit 302, a signal line 406 for outputting reduced image data on the output line 305 of FIG. 5, and an input line 407 for parameters received from the decision unit 301. The number of times reduction is repeated is calculated by a CPU 307 in dependence upon a magnification designated at a control panel 308, and the calculated number is inputted on this line.

First, the number of times reduction is repeated is set in the selector 401 from the input signal line 407. Next, the image data inputted from the line 405 is temporarily stored in the frame memory 403.

Next, the first reduction processing step is performed with the frame memory 403 serving as a memory for storing the original image and the frame memory 404 serving as a memory for storing the reduced image. This reduction processing step is executed by the ½ reducing circuit 402. At this time, the ½ reducing circuit 402 uses nine pixels from the original image and three pixels from the reduced image as the referential pixels, in the same manner as illustrated in FIG. 4. These pixels are inputted from the selector 401 to the ½ reducing circuit 402 via the signal lines 408, 409. The output from the ½ reducing circuit 402 is returned to the selector 401, through which the output is written in the frame memory 404 for the reduced image.

When one reducing operation thus ends, the second reducing operation is executed in similar fashion with the frame memory 404 serving as a memory for storing the original image and the frame memory 403 serving as a memory for storing the reduced image.

Thereafter, and in similar fashion, reduction is carried out repeatedly the set number of times r until the finally obtained image is outputted on line 406.

The detailed construction of the ½ reducing circuit 402 shown in FIG. 6 is similar to that of the ½ reducing circuit of the first embodiment and need not be described in detail again.

In accordance with the second embodiment of the invention described above, an enlarging operation which involves simple processing and a fine-line preserving, fixed-magnification ½ reducing operation are combined, thereby making it possible to perform a change in magnification at any reduction ratio. In addition, the picture quality of the reduced image can be preserved.

<Third Embodiment>

A third embodiment will now be described in which image reduction according to the invention is applied to a line density conversion of 400 dpi→300 dpi.

Figure 9A:
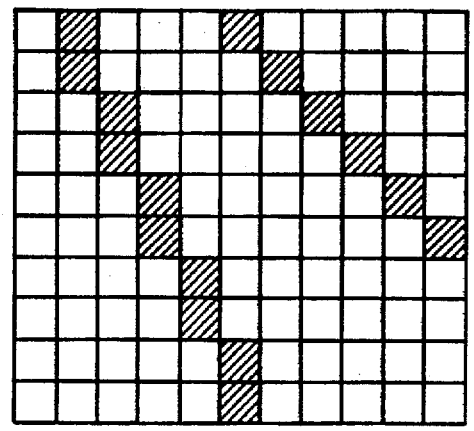
FIGS. 9A to 9C and FIGS. 10A to 10C are diagrams for describing examples of image reduction according to the prior art.
Figure 9B:
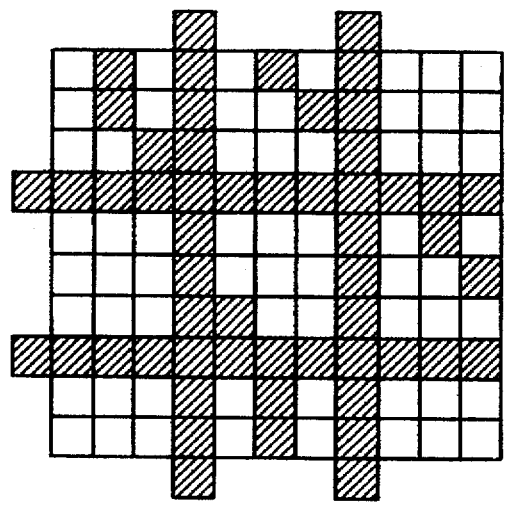
Figure 9C:
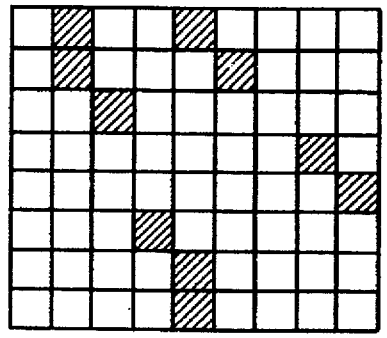
Figure 10A:
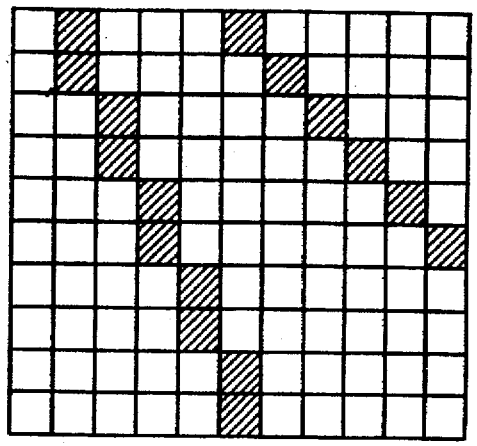
Figure 10B:
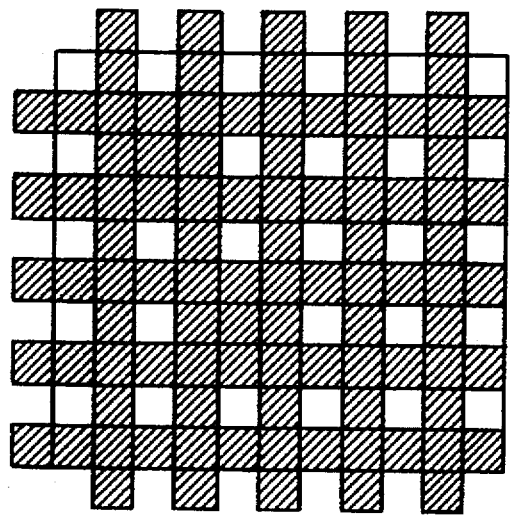
Figure 10C:
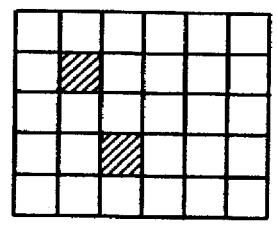

In the third embodiment, the method of reduction differs from that of FIGS. 9 and 10 described above. For example, enlargement processing at a magnification of 1.5 is performed when the reduction magnification is ¾, and thereafter fine-line preserving ½ reduction is carried out. The hardware for executing these processing steps can be implemented by a circuit arrangement similar to that of the first embodiment.

According to the third embodiment, a coordinate axis is taken along the main scanning direction, and n−½ is adopted as the center position of the n-th pixel in the main scanning direction of the original image. If enlargement processing at a magnification of p is applied to the original image at this time, the center of the k-th pixel in the enlarged image will have a coordinate in the corresponding original image which is k/p−½p. By using the values of the pixels in the original image whose centers are nearest this position as the values of pixels in the enlarged image, enlargement at any desired magnification can be carried out with ease.

In this embodiment, the enlargement ratio is 3/2. Therefore, an index I of the nearest pixel in the original image is given by $I=[2(k+1)/3]$ (round off)

In the subordinate scanning line also, use is made of a line whose index is given by this equation. However, this is not a line in the original image. Instead, a line having this index in the original image is enlarged in the main scanning direction, and this enlarged line is used. By virtue of this operation, an enlarged image corresponding to 600 dpi is obtained from a 400 dpi original image.

This enlarging operation repeatedly uses one portion of the pixels contained in the original image, and therefore the continuity of fine lines in the original image is maintained in its entirety.

FIGS. 7A to 7D illustrate specific example of variable magnification processing according to the third embodiment.

The reducing method is implemented by a table of 12 referential pixels obtained in accordance with the method described in the aforementioned specification of U.S. patent application Ser. No. 07/501,846 filed on Mar. 30, 1990. In this conversion, the continuity of all rows of connected dots is maintained in the reduced image. By virtue of this reducing operation, a reduced image of 300 dpi is obtained from the enlarged image of 600 dpi, which was obtained as described above.

<Fourth Embodiment>

In general, an image for printing has a higher resolution and a greater number of pixels than an image presented on a display. Accordingly, when it is necessary to present the printing image data on a display in order to verify the image, reduction is required before the display is made.

FIG. 8 is a block diagram showing an image reducing display unit, which is one example of an application of a reducing circuit according to a fourth embodiment of the invention. Numeral 1 denotes a reducing circuit, 2 a display unit and 3 a disk unit for storing image data.

The printing image data read out of the disk unit 3 is displayed upon being reduced by the reducing circuit 1 to a size suited to the display screen of the display unit 2.

In the description given above, the ½ reduction is carried out by employing the method described in the aforementioned specification of CFM 99US. However, it goes without saying that the invention is not limited to this example and can be practiced using other methods of ½ reduction.

It should be noted that the number of peripheral pixels used in order to preserve fine lines is not limited to that of the foregoing embodiments.

Further, the ½ reduction can be realized not only by a ROM but also by a RAM or gate array.

Further, the invention is applicable not only to a case in which the size of an image is converted, as in the foregoing embodiments, but also to a case in which the resolution of an image (the number of pixels per unit image) is converted.

Further, the present invention is not limited to an image apparatus but is applicable also to a facsimile apparatus, a copying machine, a video camera, etc.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising the steps of:
    enlarging, proportionally, a size of an input image; and
    reducing a size of the enlarged image in such a manner that fine lines in the enlarged image are preserved,
    wherein magnification at a predetermined magnification rate, in which fine lines of an input image are preserved, is achieved by combination of an enlargement performed in said enlarging step and a reduction performed in said reducing step, and wherein the number of pixels comprising the input image is increased in said enlarging step while the number of pixels comprising the enlarged image is decreased in said reducing step.

2. The method according to claim 1, wherein said enlarging step is such that when the input image is subjected to enlargement processing by a factor p, with the center position of an n-th pixel in a main scanning direction or subordinate scanning direction of the original image being represented by n–½, the value of a pixel in the original image whose center is nearest a coordinate k/p–½p, in the original image, of the center of a k-th pixel in the corresponding enlarged image is used as the value of a pixel in the enlarged image.

3. The method according to claim 1, wherein reduction processing in said reducing step is executed two or more times.

4. The method according to claim 1, wherein, when the input image is reduced by a factor p (where ½<p<1), the input image is enlarged by a factor of 2×p in said enlarging step, and a ½ reducing operation is performed in said reducing step in such a manner that the fine lines of the enlarged image are preserved.

5. The method according to claim 1, wherein, when the input image is reduced by a factor $p^2$, as a first stage, the input image is enlarged by a factor 2×p, a ½ reducing operation is performed in such a manner that the fine lines in the enlarged image are preserved, and an image which is p times reduced from the input image is obtained, and then, as a second stage, the image which is p times reduced from the input image is enlarged by a factor 2×p, a ½ reducing operation is performed in such a manner that fine lines in the enlarged image are preserved, and a reduced image which is $p^2$ times reduced from the input image is obtained.

6. The method according to claim 1, wherein said enlarging step includes performing enlargement at an enlargement ratio of 2 or less, and said reduction step has a reduction ratio of ½.

7. The method according to claim 6, wherein, when the enlargement ratio in said enlargement step is E in a case where the reduction magnification is p, a number r of repetitive reducing operations in said reducing step is obtained from the following:

Number r of repetitions: $=[-\log_2 p]$ (raising)

Enlargement ratio: $E=p*2^r$ and reduction is performed r times.

8. An input processing apparatus comprising:
    input means for inputting image data;
    enlarging means for enlarging, proportionally, a size of an image represented by the input image data; and
    reducing means for reducing the size of the image that has been enlarged by said enlarging means in such a manner that fine lines of the enlarged image are preserved,
    wherein a magnification at a predetermined magnification rate, in which lines of an input image are preserved, is achieved by combination of an enlargement performed by said enlarging means and a reduction performed by said reducing means, and wherein the number of pixels comprising the input image is increased by said enlarging means while the number of pixels comprising the enlarged image is decreased by said reducing means.

9. The apparatus according to claim 8, wherein the input image data is binary image data.

10. The apparatus according to claim 8, wherein said reducing means performs reduction at a ratio of ½.

11. The apparatus according to claim 8, wherein said reducing means comprises a memory.

12. The apparatus according to claim 8, wherein said reducing means uses peripheral pixels of a pixel of interest in order to output data indicative of the pixel of interest.

13. The apparatus according to claim 8, wherein said reducing means performs the reducing operation repeatedly.

14. An image processing apparatus comprising:
    first input means for inputting image data;
    second input means for inputting magnification data indicating a magnification rate;
    enlarging means for enlarging, proportionally, a size of an image represented by the input image data; and
    reducing means for reducing the size of the image that has been enlarged by said enlarging means, in accordance with the magnification data,
    wherein a magnification at the magnification rate indicated by the magnification data is performed by combination of an enlargement by said enlarging means and a reduction by said reducing means, and wherein the number of pixels comprising the input image is increased by said enlarging means while the number of pixels comprising the enlarged image is decreased by said reducing means.

15. The apparatus according to claim 14, wherein the input image data is binary image data.

16. The apparatus according to claim 14, wherein said reducing means performs reduction at a ratio of ½.

17. The apparatus according to claim 14, wherein said reducing means comprises a memory.

18. The apparatus according to claim 14, wherein said reducing means uses peripheral pixels of a pixel of interest in order to output data indicative of the pixel of interest.

19. The apparatus according to claim 14, wherein said reducing means performs the reducing operation repeatedly.

20. An image processing method comprising the steps of:
    inputting image data;

inputting magnification data indicating a magnification rate;

enlarging, proportionally, a size of an image represented by the input image data; and reducing the size of the image that has been enlarged in said enlarging step, in accordance with the magnification data, wherein a magnification at the magnification rate indicated by the magnification data is performed by combination of an enlargement in said enlarging step and a reduction in said reducing step, and wherein the number of pixels comprising the input image is increased in said enlarging step while the number of pixels comprising the enlarged image is decreased in said reducing step.

21. An image processing apparatus comprising:

first input means for inputting image data;

second input means for inputting magnification data indicating a magnification rate;

enlarging means for enlarging, proportionally, a size of an image represented by the input image data; and reducing means for reducing the size of the image that has been enlarged by said enlarging means, wherein said reducing means performs the reducing operation repeatedly and a number of repetitions is obtained from the magnification data, and wherein a magnification at the magnification rate indicated by the magnification data is performed by combination of an enlargement performed by said enlarging means and a reduction performed by said reducing means, and wherein the number of pixels comprising the input image is increased by said enlarging means while the number of pixels comprising the enlarged image is decreased by said reducing means.

22. The apparatus according to claim 21, wherein the input image data is binary image data.

23. The apparatus according to claim 21, wherein said reducing means performs reduction at a ratio of ½.

24. The apparatus according to claim 21, wherein said reducing means comprises a memory.

25. The apparatus according to claim 21, wherein said reducing means uses peripheral pixels of a pixel of interest in order to output data indicative of the pixel of interest.

26. An image processing method comprising the steps of:

inputting image data;

increasing resolution of the input image data; and decreasing the resolution of the image data that has been increased in said increasing step in such a manner that fine lines of an image represented by the input image data are preserved, wherein the number of pixels comprising the input image is increased in said increasing step while the number of pixels comprising the enlarged image is decreased in said decreasing step.

27. An image processing method comprising the steps of:

inputting image data;

inputting magnification data indicating a magnification rate;

enlarging, proportionally, a size of an image represented by the input image data; and reducing the size of the image that has been enlarged in said enlarging step, wherein said reducing step includes performing the reducing operation repeatedly and obtaining a number of repetitions from the magnification data, and wherein a magnification at the magnification rate indicated by the magnification data is performed by combination of an enlargement performed in said enlarging step and a reduction performed in said reducing step, and wherein the number of pixels comprising the input image is increased in said enlarging step while the number of pixels comprising the enlarged image is decreased in said reducing step.

28. An image processing apparatus comprising:

input means for inputting image data;

first processing means for increasing resolution of the input image data; and second processing means for decreasing the resolution of the image data that has been increased by said first processing means in such a manner that fine lines of an image represented by the input image data are preserved, wherein the number of pixels comprising the input image is increased by said first processing means while the number of pixels comprising the enlarged image is decreased by said second processing means.

29. The apparatus according to claim 28, wherein the input image data is binary image data.

30. The apparatus according to claim 28, wherein said second processing means decreases the resolution of the image data at a ratio of ½.

31. The apparatus according to claim 28, wherein said second processing means comprises a memory.

32. The apparatus according to claim 28, wherein said second processing means uses peripheral pixels of a pixel of interest in order to output data indicative of the pixel of interest.

33. An image processing method comprising the steps of:

enlarging, proportionally, a size of an input image; and reducing a size of the enlarged image, wherein magnification at a predetermined magnification rate is achieved by combination of an enlargement performed in said enlarging step and a reduction performed in said reducing step, and wherein the number of pixels comprising the input image is increased in said enlarging step while the number of pixels comprising the enlarged image is decreased in said reducing step.

34. The method according to claim 33, wherein said enlarging step includes performing enlargement at an enlargement ratio of 2 or less, and wherein, in said reduction step, a reduction ratio is ½.

35. The method according to claim 33, wherein reduction processing in said reducing step is executed two or more times.

36. The method according to claim 33, wherein the input image is represented by binary image data.

37. The method according to claim 33, wherein, in said reducing step, a table memory is used for reducing the enlarged image.

38. The method according to claim 33, wherein, in said reducing step, peripheral pixels of a pixel of interest are used in order to output data indicative of the pixel of interest.

* * * * *

UNITED STATES PATENT AND TRADEMARK OFFICE
CERTIFICATE OF CORRECTION

PATENT NO. : 5,680,225

DATED : October 21, 1997

INVENTOR(S): YASUJI HIRABAYASHI ET AL.

It is certified that error appears in the above-identified patent and that said Letters Patent is hereby corrected as shown below:

<u>ON TITLE PAGE AT [56] FOREIGN PATENT DOCUMENTS</u>
"334677     2/1991    Japan" should read
  --3-34677   2/1991   Japan--

<u>ON TITLE PAGE AT [57] ABSTRACT</u>
Line 9, "(where, and" should read --(where--.

<u>COLUMN 1</u>
Line 65, "a" should read --an--.

<u>COLUMN 6</u>
Line 37, "specific" should read --a specific--.

<u>COLUMN 10</u>
Line 3, "and" should be deleted.

Signed and Sealed this

Fourteenth Day of July, 1998

Attest:

BRUCE LEHMAN

*Attesting Officer*          *Commissioner of Patents and Trademarks*